United States Patent [19]

Mulder

[11] Patent Number: 4,505,623

[45] Date of Patent: Mar. 19, 1985

[54] APPARATUS FOR TRANSFERRING POWDER FROM BULK DRUMS

[75] Inventor: Douglas C. Mulder, Wellington, Ohio

[73] Assignee: Nordson Corporation, Amherst, Ohio

[21] Appl. No.: 419,166

[22] Filed: Sep. 17, 1982

[51] Int. Cl.[3] .............................................. B65G 53/26

[52] U.S. Cl. .................................... 406/114; 406/134; 406/141; 406/153

[58] Field of Search ............... 406/114, 113, 116, 134, 406/136, 115, 141, 137, 151–153, 36; 414/448

[56] References Cited

U.S. PATENT DOCUMENTS

| | | | |
|---|---|---|---|
| 2,301,617 | 11/1942 | Cox et al. | 406/152 |
| 3,428,098 | 2/1969 | Slay | 406/36 X |
| 3,951,462 | 4/1976 | DeFrancisci | 406/114 |
| 4,034,878 | 7/1977 | Fox | 414/448 |
| 4,265,572 | 5/1981 | Bourdois et al. | 406/114 |
| 4,412,762 | 11/1983 | Lepley et al. | 406/134 |

*Primary Examiner*—Jeffrey V. Nase
*Assistant Examiner*—Daniel R. Edelbrock
*Attorney, Agent, or Firm*—Wood, Herron & Evans

[57] ABSTRACT

Apparatus for emptying a drum of powdered material. The drum is mounted on a support at a 45° angle to vertical. The drum has a cap having two holes and sleeves projecting into the drum from the holes. The sleeves are aligned with the bottom corner of the drum. A feed tube, loosely surrounded by a guide tube, is inserted through each of the sleeves into contact with the powder in the drum. Each feed tube has a vacuum pump which aspirates powder through the tube and out of the drum while atmospheric air passes between the feed and guide tubes to fluidize the powder. A vibrator is mounted on the support for the drum to continually vibrate the powder toward the lower ends of the feed tubes.

3 Claims, 4 Drawing Figures

APPARATUS FOR TRANSFERRING POWDER FROM BULK DRUMS

This invention relates to apparatus for emptying powder from a drum.

In a powder booth for electrostatic finishing with powdered material, it is necessary to supply powder to a hopper associated with the powder booth on a more or less continuous basis. The powder is normally received from a supplier in containers such as the familiar 55 gallon drum. The powder in the drum must be transferred to the hopper for the spray booth.

In the crudest form of transfer, the powder is simply ladled out of the drum into the hopper for the spray booth. A more sophisticated approach to the transfer has been with the use of a wand connected to a vacuum pump, the wand being manually inserted into the drum and swept around the powder in the drum until all of the powder has been evacuated and delivered to the hopper.

It has been an objective of the present invention to provide improved apparatus for more efficiently transferring the powder from a drum to a hopper. This objective of the invention is attained by providing a wheeled support for the drum which carries the drum with its axis at approximately a 45° angle to vertical. A special lid or cap for the drum is provided, the cap having at least one hole and a sleeve surrounding the hole, the sleeve projecting into the drum in alignment with the lower corner of the drum. A feed tube, connected at its upper end to a vacuum pump, is slidably mounted in the sleeve so that its lower end rests upon the powder in the drum. As the powder in the drum is withdrawn by the vacuum pump and delivered to the spray booth hopper, the feed tube gradually slides to the bottom of the drum and picks up the last remnants of powder which drift to the bottom corner of the drum.

The invention further provides a vibrator mounted on the support for the drum, the vibrator continuously vibrating the powdered contents of the drum, tending to cause those contents to flow toward the lower end of the feed tube thereby filling in the pocket which is created by the feed tube's withdrawal of the powder from the drum.

Another feature of the invention has been to provide a guide tube surrounding the feed tube, the guide tube being slightly larger than the feed tube so as to provide about a 1/16 inch clearance between the two tubes. As the vacuum withdraws powder through the feed tube, atmospheric air is drawn through the clearance between the two into the interior of the drum immediately adjacent the lower end of the feed tube. That incoming atmospheric air agitates and fluidizes the powder immediately adjacent the end of the feed tube thereby facilitating withdrawal of the powder into the feed tube.

The apparatus of the invention just described will transfer about 125 pounds of powder per hour from the drum. It may be desired to evacuate the powder more rapidly from the drum. It is therefore another feature of the invention to provide a second feed tube, guide tube and vacuum pump, the tubes being insertable in a second sleeve and hole in the cap for the drum. Preferably, both pumps are connected by short lengths of hose to a single manifold mounted on the support for the drum. In the preferred form of the invention, a rack is mounted to a vertical post forming part of the support for the drum, the rack carrying the two pumps and associated tubes. The manifold is in turn mounted upon the post.

The pump for each feed tube is preferably of the type wherein air under pressure passes through the pump and aspirates the powder through the feed tube up into the pump. The air exhaustng from the pump carries the powder from the pump to the hopper. In the preferred form of the invention, the manifold connected to the hoses has a third port which is connected to the vibrator referred to above by a short length of hose.

The several features of the invention will become more readily apparent from the following detailed description taken in conjunction with the accompanying drawings in which.

Figure 1:
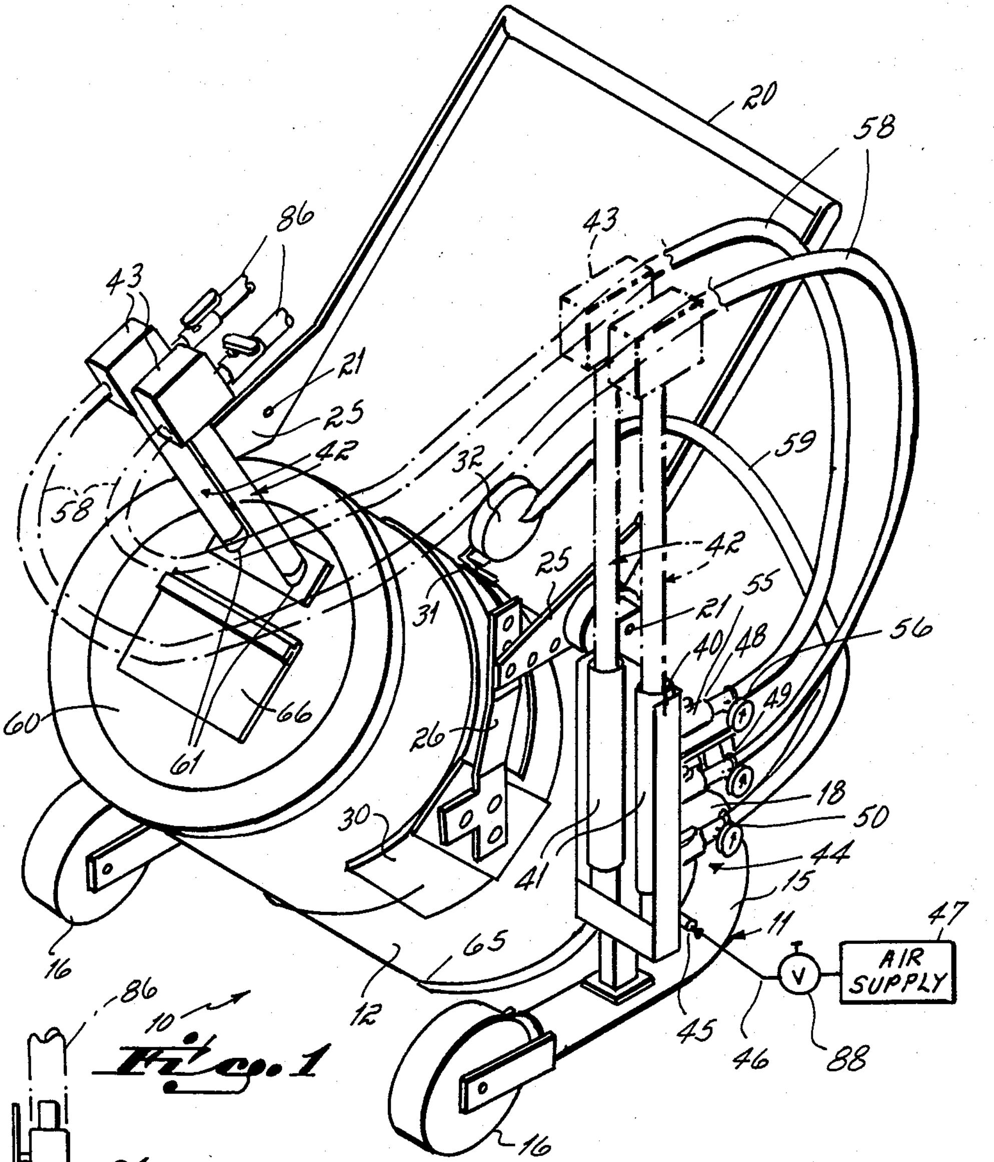
FIG. 1 is a perspective view of the invention.

Referring to the drawings, the apparatus indicated at 10 has a support or cart 11 for a drum 12. The cart has, as a main structural element, a U-shaped tubular member 15. Wheels 16 are mounted at the ends of the tubular member 15 and a swivel caster 17 is mounted at the opposite end of the U-shaped member 15 at its bight portion 18.

Two vertical posts 19 are secured to the U-shaped base. A U-shaped handle 20 is pivotally mounted at 21 to each of the posts 19. At its lower ends, the handle terminates in two brackets 25 which are in turn secured to depending vertical arms 26. The vertical arms are bolted to an arcuate band 30 which surrounds a portion of the upper surface of the drum 12, the arcuate band enclosing more than half the circumference of the drum so as to be able to support the drum when it is inserted within the band.

The band 30 has an L-shaped bracket 31 mounted on its top surface. The bracket has an upstanding leg to which a pneumatic vibrator 32 is attached.

At one side of the support 11, a rack 40 is mounted to a vertical post 19. The rack has two cylindrical receptacles 41 which receive two feed and guide tube assemblies 42 and the vacuum pumps 43 associated with the feed tubes.

A manifold 44 is also mounted on the side of the post 19 adjacent rack 40. The manifold has a lower inlet connection 45 which is connected by a hose 46 to source of air under pressure 47. The manifold has three outlets 48, 49 and 50. Each of the outlets is provided with a manual open-and-close valve 55 and a pressure regulator 56. The upper two outlets 48 and 49 are connected respectively to the vacuum pumps 43 by short pieces of hose 58. The lowermost outlet 50 is connected by a hose 59 to the vibrator 32.

The drum has a lid or cap 60 having two holes 61 formed in the upper portion of it. Surrounding each hole and projecting into the drum from the hole is a sleeve 62. As can be seen, the drum is mounted at about a 45° angle so as to present a lower corner 65 in which the remnants of the powder within the drum will collect when the drum is substantially entirely evacuated. The sleeves 62 are aligned with the lower corner 65 of the drum. The sleeves are adapted to slidably receive the tube assemblies 42 and to permit them to move progressively toward the lower corner 65 of the drum as the contents in the drum are progressively evacuated.

An inspection window 66 is also provided in the cap 60.

Figure 4:
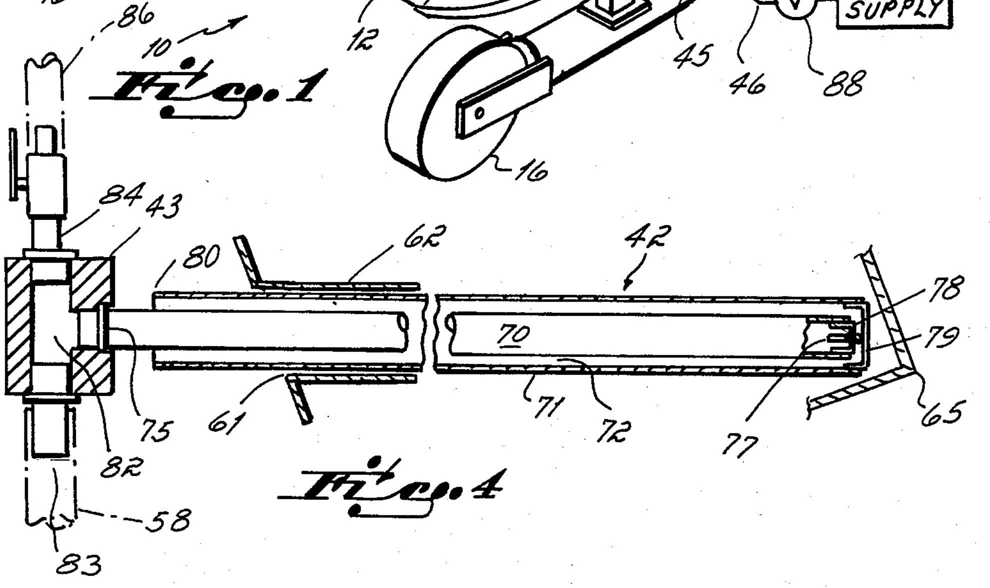
FIG. 4 is a cross-sectional view through the feed and guide tubes.
Figure 3:
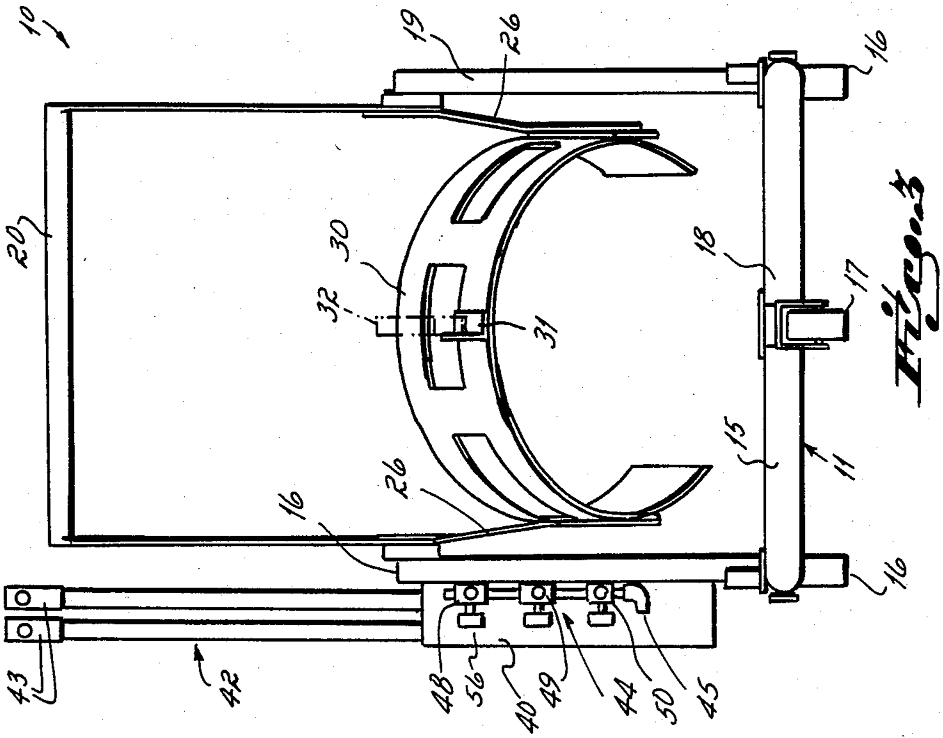
FIG. 3 is a front elevational view of the invention.
Figure 2:
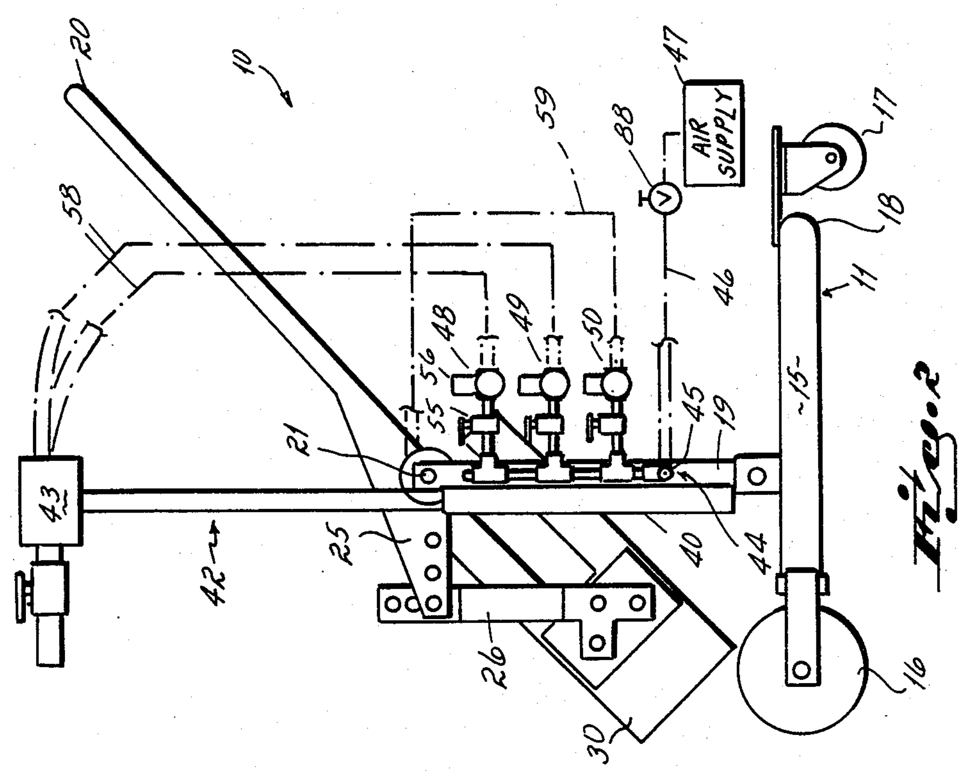
FIG. 2 is a side elevational view of the invention.

The feed tube and guide tube assembly is shown in FIG. 4. There, it can be seen that a feed tube 70 is surrounded by a guide tube 71, the guide tube 71 having an inside diameter about ⅛ inch greater than the outside diameter of the feed tube 70 so as to provide about 1/16 inch clearance, indicated at 72, between the two tubes. In the preferred form of the invention, the feed tube has an outside diameter of about 1 inch and the guide tube has an inside diameter of about 1⅛ inches.

At the upper end of the feed tube 70, a ⅛ inch diameter rod 75 is welded around the tube to form a collar. The collar 75 forms a stop for the vacuum pump 43 into which the feed tube is inserted.

At the other end of the feed tube, cross rods 77 are welded to the inside of the tube with a portion of one of the rods, indicated at 78, projecting slightly from the end of the tube. Similarly, cross rods 79 are welded to the outside of the guide tube 71. The cross rods block the flow of plastic or paper which might be in the drum. When the feed tube is inserted into the guide tube, the engagement of the rod portion 78 with the cross rods 79 of the guide tube fixes the axial position of the tubes 70 and 71 with respect to each other. As can be seen from FIG. 4, the upper end 80 of the guide tube 71 is open so that atmospheric air can be drawn through the tubes as air and powder are drawn upwardly through feed tube 70.

The vacuum pump is preferably a relatively simple device having a passageway 82 between an inlet 83 and an outlet 84. When air under pressure passes through the passageway from the inlet 83 to the outlet 84, it will create a vacuum in the feed tube 70 to which it is connected and thus aspirate the powder out of the drum.

In the operation of the invention, a drum filled with powder is mounted in the band 30 of the cart 11 and is wheeled up to the hopper of the powder booth. A hose 86 is placed from one or both of the vacuum pumps 43 into the hopper. One or more of the tubes 42 is inserted through one or more of the sleeves 62 and the cap 60 until the lower end of the feed tube rests upon the powder. A valve 88 at the air supply is opened to introduce air into the manifold 44. The air from the manifold passes through the hose 59 to the vibrator 32 causing it to vibrate the drum and consequently the powdered contents within the drum.

The valves 55 on the operative tubes 58 are opened causing the air to pass through check valves and the pumps 43. As the air passes through the pumps 43, a vacuum in the feed tube 70 is created tending to draw powder and air up the feed tube and through the hose 86 to the hopper. As air is drawn up through the feed tube, atmospheric air is drawn through the clearance 72 between the two tubes 70 and 71. That atmospheric air agitates and fluidizes the powder immediately adjacent the lower end of the feed tube thereby facilitating its evacuation. As powder is removed from the upper surfaces of the powder in the drum, a pocket tends to be created. The continuous vibration of the powder by means of the vibrator 32 causes the powder to flow and fill up the pocket continuously as it is being removed.

This type of operation is continued until the feed tube and its associated guide tube slowly move toward the lower corner 65 of the drum. The vibration of the powder causes the last remnants of it to slide to the lower corner of the drum where it is picked up and discharged by the feed tube 70.

Apparatus 10 can also be incorporated into an automatic system. If valves 55 are kept open, it is apparent that valve 88 can serve as an on/off control for the transfer of powder. By using a solenoid activated valve or an air piloted valve, whose pilot air is controlled through a solenoid valve, an electrical signal can serve as the on/off command to apparatus 10. In a preferred embodiment the electrical signal for on/off command is the output of a level sensing device contained within the hopper. Level sensing devices such as a float switch or a tuning fork switch are presently used to provide this signal.

Having described my invention, I claim:

1. Apparatus for emptying a large drum of powdered material comprising, a support for holding said drum with its axis at approximately 45°, said support including an arcuate band surrounding more than one-half the circumference of said drum and in intimate contact therewith, a vibrator mounted adjacent said drum to vibrate said powdered material, a cap for said drum, said cap having at least one hole therein and a sleeve surrounding said hole, said sleeve being aligned with the lower corner of said drum, a feed tube and a guide tube surrounding said feed tube with a small clearance between said tubes, said tubes being slidable by gravity in said sleeve to the lower corner of said drum, a vacuum pump on said feed tube, and means supplying air under pressure to said vacuum pump to aspirate powder out of said drum when said feed and guide tubes are mounted in said sleeve, whereby atmospheric air is drawn into said drum through said clearance between said tubes to agitate and fluidize said powder adjacent the lower end of said feed tube.

2. Apparatus as in claim 1 further comprising, a pump storage rack mounted on said drum support, said rack having at least one receptacle for receiving said guide and feed tubes, a manifold mounted on said support, means connecting said air supply means to said manifold, and a hose connecting said manifold to said vacuum pump.

3. Apparatus as in claim 2 further comprising, a second receptacle adjacent said first named receptacle, and a second feed tube, guide tube and second vacuum pump mounted in said receptacle, said second vacuum being connected by a hose to said manifold.

* * * * *